United States Patent
Liang et al.

(10) Patent No.: US 8,225,916 B2
(45) Date of Patent: *Jul. 24, 2012

(54) TORQUE CONVERTER WITH COOLING FLUID FLOW ARRANGEMENT AND ARRANGEMENT FOR TORQUE TRANSFER TO A DAMPER

(75) Inventors: Yang Liang, Waterloo, IA (US); Michael G. Swank, Shreve, OH (US); Jonathan G. Jameson, Canton, OH (US); Kevin Parks, Wooster, OH (US); Steven Olsen, Wooster, OH (US); Joachim Hoffmann, Achern-Grossweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1089 days.

This patent is subject to a terminal disclaimer.

(21) Appl. No.: 12/150,840

(22) Filed: May 1, 2008

(65) Prior Publication Data

US 2008/0277223 A1  Nov. 13, 2008

Related U.S. Application Data

(60) Provisional application No. 60/958,345, filed on Jul. 5, 2007, provisional application No. 60/928,437, filed on May 9, 2007.

(51) Int. Cl.
*F16D 33/02* (2006.01)
(52) U.S. Cl. .................................................. 192/3.29
(58) Field of Classification Search ................ 192/3.29, 192/3.3, 70.12, 113.34–113.36
See application file for complete search history.

(56) References Cited

U.S. PATENT DOCUMENTS

| | | | | |
|---|---|---|---|---|
| 3,068,974 A * | 12/1962 | Jandasek | ......................... | 192/3.3 |
| 4,181,203 A * | 1/1980 | Malloy | ......................... | 192/3.3 |
| 5,348,127 A * | 9/1994 | Murata et al. | .................. | 192/3.3 |
| 5,964,329 A * | 10/1999 | Kawaguchi et al. | ........... | 192/3.3 |
| 6,264,018 B1 * | 7/2001 | Matsuoka et al. | ........... | 192/3.29 |
| 6,397,996 B1 * | 6/2002 | Yabe | ........................ | 192/113.34 |
| 6,575,276 B2 * | 6/2003 | Fukunaga et al. | ........... | 192/3.29 |
| 6,715,595 B2 * | 4/2004 | Schmid | | |
| 6,814,202 B1 * | 11/2004 | Johann et al. | ................... | 192/3.3 |
| 7,891,473 B2 * | 2/2011 | Maienschein et al. | ......... | 192/3.3 |
| 2002/0125093 A1 * | 9/2002 | Maienschein et al. | ......... | 192/3.3 |
| 2004/0154894 A1 * | 8/2004 | Braford et al. | ........... | 192/113.35 |
| 2005/0224308 A1 * | 10/2005 | Hauck et al. | ............. | 192/113.36 |
| 2008/0000745 A1 | 1/2008 | Swank et al. | | |
| 2008/0277227 A1 * | 11/2008 | Jameson et al. | ............. | 192/3.33 |

* cited by examiner

*Primary Examiner* — Gregory Binda
*Assistant Examiner* — Josh Skroupa
(74) *Attorney, Agent, or Firm* — Simpson & Simpson, PLLC

(57) ABSTRACT

A torque converter including: a membrane forming a portion of a release chamber for the clutch; a friction plate for a torque converter clutch, the plate rotationally connected to a turbine hub and disposed within the release chamber; and a damper element rotationally connected to the turbine hub and to the torque converter clutch. In lock-up mode for the converter, the plate is arranged to transmit torque to the turbine hub. The torque converter includes cooling fluid and a torus and the clutch further comprises friction material and in some aspects, during the lock-up mode, the release chamber is sealed except for a flow of the cooling fluid from the release chamber through the friction material to the torus. The plate includes oppositely disposed first and second radial surfaces and during a torque converter mode for the torque converter, respective pressures on the first and second surfaces are substantially equal.

25 Claims, 14 Drawing Sheets

TORQUE CONVERTER WITH COOLING FLUID FLOW ARRANGEMENT AND ARRANGEMENT FOR TORQUE TRANSFER TO A DAMPER

CROSS-REFERENCE TO RELATED APPLICATIONS

This application claims the benefit under 35 U.S.C. §119 (e) of U.S. Provisional Application No. 60/958,345 filed on Jul. 5, 2007 and U.S. Provisional Application No. 60/928,437 filed on May 9, 2007, which applications are incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a torque converter with a torque converter clutch providing torque to a turbine hub during lock-up mode while minimizing frictional losses during torque converter mode and providing improved cooling flow.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

In lock-up mode for the torque converter, there is little or no torque applied to turbine hub 19. At the same time, cover plates 16 are receiving engine torque through the damper. Thus, there is intermittent contact between cover plate 16 and the turbine hub at the at the spline connection between the plate and the hub, resulting in undesirable vibration and noise. Alternately stated, the cover plate 'bangs' against the turbine hub at the spline connection due to fluctuations in the engine torque, causing the vibration and noise noted above. Commonly-owned U.S. Provisional Patent Application No. 60/816,932, filed Jun. 28, 2006 discloses a means for preventing the vibration and noise noted above during operation of a torque converter during torque converter mode. However, it would be desirable to further reduce drag in the torque converter clutch during the operation in torque converter mode.

Therefore, there is a long-felt to provide a torque converter with a means of preventing rattle and reducing drag in a torque converter clutch during operation in torque converter mode.

BRIEF SUMMARY OF THE INVENTION

The present invention broadly comprises a torque converter including: a first pressure chamber in fluid communication with a second pressure chamber through a torque converter clutch and in fluid communication with a torus; and a flow-control element arranged to create an opening between the first and second chambers during torque converter mode for the torque converter. In some aspects, the torque converter includes a torque converter clutch and cooling fluid arranged to flow between the first and second chambers through spaces in the clutch and the opening is separate from the spaces. In some aspects, the opening is closed during lock-up mode for the torque converter. In some aspects, the torque converter includes a piston plate and the clutch includes a drive plate, the piston plate is arranged to operate the clutch, and the flow-control element includes a compressible resilient element disposed between the piston plate and the friction plate.

In some aspects, when the clutch is open, the resilient element is arranged to urge the piston plate and the friction plate apart to create the opening between the piston plate and the friction plate and when the clutch is closed, the piston plate is arranged to compress the resilient element against the friction plate to close the opening. In some aspects, the flow-control element includes an orifice, with a pressure-controllable flap, for the chamber. In some aspects, the flap is preloaded to remain closed and the flap is arranged to displace to enable a flow of the cooling fluid from the first chamber through the orifice when pressure in the first chamber is greater than a combination of the preload on the flap and pressure in the second chamber. In some aspects, the torque converter includes a friction plate at least partially disposed between the first and second chambers and the orifice is disposed in the friction plate.

In some aspects, the clutch includes friction material and wherein when the clutch is closed, the cooling fluid is supplied to the second chamber, closing the flap and forcing a flow of cooling fluid through the friction material to the first chamber. In some aspects, the flap includes a spring with an edge fixedly secured to the friction plate. In some aspects, the torque converter includes a turbine hub rotationally connected to a damper and the friction plate is rotationally connected to the turbine hub. In some aspects, the torque converter includes an apply chamber for the clutch and pressure in the apply pressure chamber is controlled independent of pressure in the first and second pressure chambers.

The present invention also broadly comprises a torque converter with: a torque converter clutch with a friction plate having a first surface forming a portion of a boundary for a first pressure chamber and a second surface forming a portion of a boundary for a second pressure chamber; and a flow-control element arranged to regulate a pressure for cooling fluid in the first chamber to regulate a differential between respective pressures on the first and second surfaces. In some aspects, the clutch includes friction material and when the clutch is closed, the flow-control element blocks flow of the cooling fluid out of the chamber through the flow-control element. In some aspects, the flow-control element enables a flow of the cooling fluid out of the chamber through the flow-control element to create a predetermined differential.

In some aspects, the torque converter includes a cover with an inner surface and the clutch includes a backing plate fixed to the inner surface and friction material arranged to frictionally engage the friction plate and the backing plate when the clutch is closed and the differential is regulated to urge the friction plate away from the backing plate to minimize drag between the friction plate and the backing plate. In some aspects, the torque converter includes a piston plate and the clutch includes a drive plate, the piston plate is arranged to operate the clutch, and the flow-control element includes a compressible resilient element disposed between the piston plate and the friction plate. In some aspects, when the clutch is open, the resilient element is arranged to urge the piston plate and the friction plate apart to create a gap in the release chamber between the piston plate and the friction plate and when the clutch is closed, the piston plate is arranged to compress the resilient element against the friction plate to close the gap between the piston plate and the friction plate.

In some aspects, the flow-control element includes an orifice, with a pressure-controllable flap, for the chamber. In some aspects, the flap is preloaded to remain closed and the flap is arranged to displace to enable a flow of the cooling fluid from the first chamber through the orifice when pressure in the first chamber is greater than a combination of the preload on the flap and pressure in the second chamber. In some aspects, the orifice is disposed in the friction plate. In some aspects, the clutch includes friction material and when the clutch is closed, the cooling fluid is supplied to the second chamber, closing the flap and forcing a flow of cooling fluid through the friction material to the first chamber. In some aspects, the flap includes a spring with an edge fixedly secured to the friction plate.

In some aspects, the torque converter includes a turbine hub rotationally connected to a damper and the friction plate is rotationally connected to the turbine hub. In some aspects, the torque converter includes a torus and an apply chamber for the clutch, the first pressure chamber is in fluid communication with the second pressure chamber and the torus and pressure in the apply pressure chamber is controlled independent of pressure in the first and second pressure chambers.

The present invention further broadly comprises a torque converter with: a membrane forming a portion of a boundary of a first chamber for the clutch; a friction plate for a torque converter clutch, the friction plate rotationally connected to a turbine hub and disposed within the first chamber; and a damper element rotationally connected to the turbine hub and to the torque converter clutch. In some aspects, in lock-up mode for the torque converter, the friction plate is arranged to transmit torque to the turbine hub. In some aspects, the damper assembly includes a cover plate and a plurality of springs and the friction plate is conformed to at least partially follow a contour of the cover plate and includes at least one opening into which the plurality of springs are partially disposed. In some aspects, the friction plate includes oppositely disposed first and second radial surfaces and respective pressures on the first and second surfaces are substantially equal. In some aspects, in response to the substantially equal respective pressures the friction plate is positioned to minimize drag with the torque converter clutch during torque converter mode for the torque converter.

In some aspects, the torque converter includes a cover with an inner surface and the clutch includes a backing plate fixedly secured to the inner surface and the membrane is disposed between the backing plate and the turbine hub and forms a seal between the backing plate and the turbine hub. In some aspects, the torque converter includes cooling fluid and a torus and the clutch includes friction material and the backing plate includes an orifice arranged to enable a flow of the cooling fluid through the friction material to the torus. In some aspects, the torque converter includes a dynamic seal disposed between the membrane and the turbine hub. In some aspects, the membrane is rotationally connected to the backing plate. In some aspects, the torque converter includes a torus, an apply chamber for the clutch, and a second pressure chamber, the first pressure chamber is in fluid communication with the second pressure chamber and the torus and pressure in the apply pressure chamber is controlled independent of pressure in the first and second pressure chambers.

The present invention broadly comprises a torque converter with: a torque converter clutch rotationally connected to a turbine shell; an apply chamber for the clutch; and a first pressure chamber in fluid communication with a second pressure chamber and a torus. Pressure in the apply pressure chamber is controlled independent of pressure in the first and second pressure chambers. In some aspects, the torque converter includes a turbine hub rotationally connected to the turbine shell. In some aspects, the torque converter includes a damper with a cover plate rotationally connected to the turbine hub. In some aspects, the turbine shell is arranged to transmit torque from the clutch to the cover plate. In some aspects, the torque converter includes a portion fixedly secured to the turbine shell. In some aspects, the clutch includes at least one friction plate and the portion includes a carrier rotationally connected to the at least one friction plate. In some aspects, the at least one friction plate is one or two friction plates.

In some aspects, the clutch includes a portion fixedly secured to the turbine shell and forming a portion of the second pressure chamber. In some aspects, the torque converter includes a cover and a damper and the clutch is connected to the damper and the turbine shell such that in lock up mode for the torque converter a first torque path is formed from the cover through the clutch to the damper and a second torque path is formed from the cover through the clutch to the turbine shell. In some aspects, the torque converter includes a friction plate at least partially disposed between the first and second chambers and the orifice is disposed in the friction plate. In some aspects, the torque converter includes a cover and the clutch is connected to the turbine such that in lock up mode for the torque converter a torque path is formed from the cover through the clutch to the turbine shell.

The present invention also broadly comprises a torque converter with: a damper with a cover plate rotationally connected to a turbine hub; and a friction plate for a torque converter clutch, the friction plate rotationally connected to the cover plate and in conjunction with the cover plate forming a portion of a boundary between first and second pressure chambers in the torque converter. In some aspects, the torque converter includes apply pressure chamber for the clutch and pressure in the apply pressure chamber is controlled independent of pressure in the first and second pressure chambers.

The present invention further broadly comprises a torque converter with: a damper with a plurality of springs disposed in a plurality of openings in a cover plate, the cover plate rotationally connected to a turbine hub; a membrane engaged with the cover plate to seal the plurality of openings; and a friction plate for a torque converter clutch, the friction plate rotationally connected to the cover plate and in conjunction with the cover plate forming a portion of a boundary between first and second pressure chambers in the torque converter. In some aspects, the torque converter includes an apply chamber for the clutch and pressure in the apply pressure chamber is controlled independent of pressure in the first and second pressure chambers.

The present invention broadly comprises a torque converter with: a cover; a torque converter clutch rotationally connected to the cover; and a piston plate for the clutch, the piston plate forming a portion of a boundary for an apply pressure chamber for the clutch. The pressure chamber is sealed with the exception of a fluid supply channel and the piston plate is arranged to displace toward a cover to close the clutch. In some aspects, the torque converter includes a torus and first and second pressure chambers, the first pressure chamber is in fluid communication with the second pressure chamber and the torus and pressure in the apply pressure chamber is controlled independent of pressure in the first and second pressure chambers. In some aspects the torque converter includes a cover plate, for a damper, rotationally connected to a turbine shell and in torque converter mode for the torque converter, the turbine shell is arranged to transmit torque directly to the damper assembly through the cover plate. In some aspects, the cover plate is fixedly secured to the turbine shell.

It is a general object of the present invention to provide a torque converter with a means of preventing rattle and reducing drag in a torque converter clutch during operation in torque converter mode, while also improving cooling flow.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
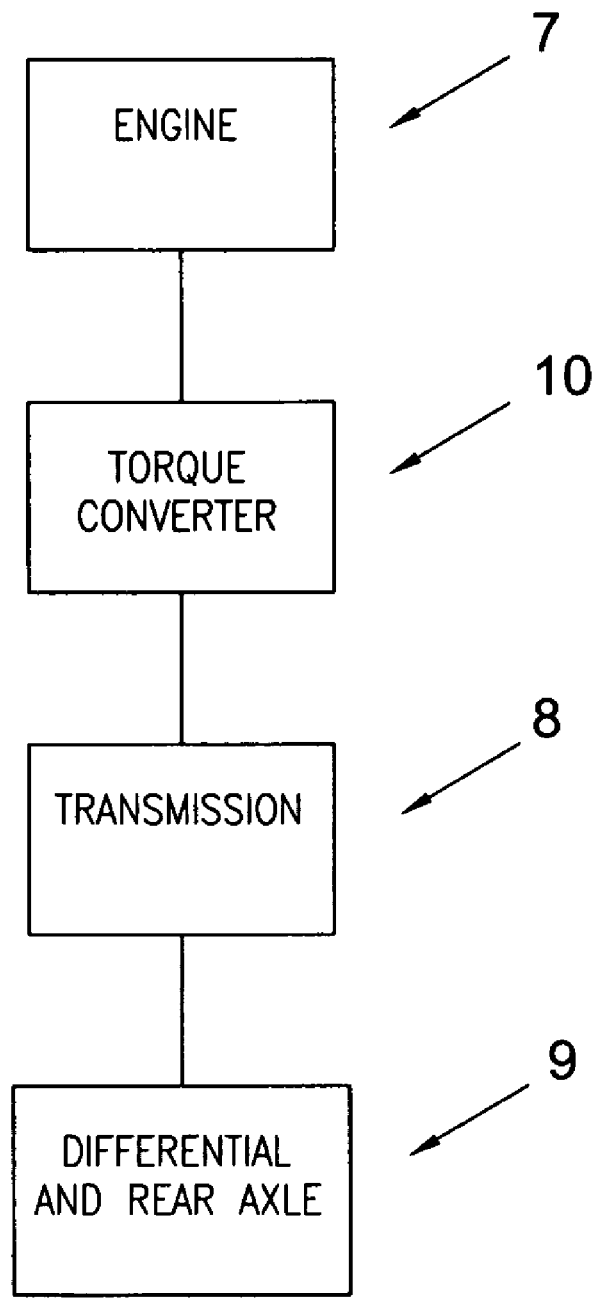
FIG. 1 is a general block diagram illustration of power flow in a motor vehicle, intended to help explain the relationship and function of a torque converter in the drive train thereof.
Figure 2:
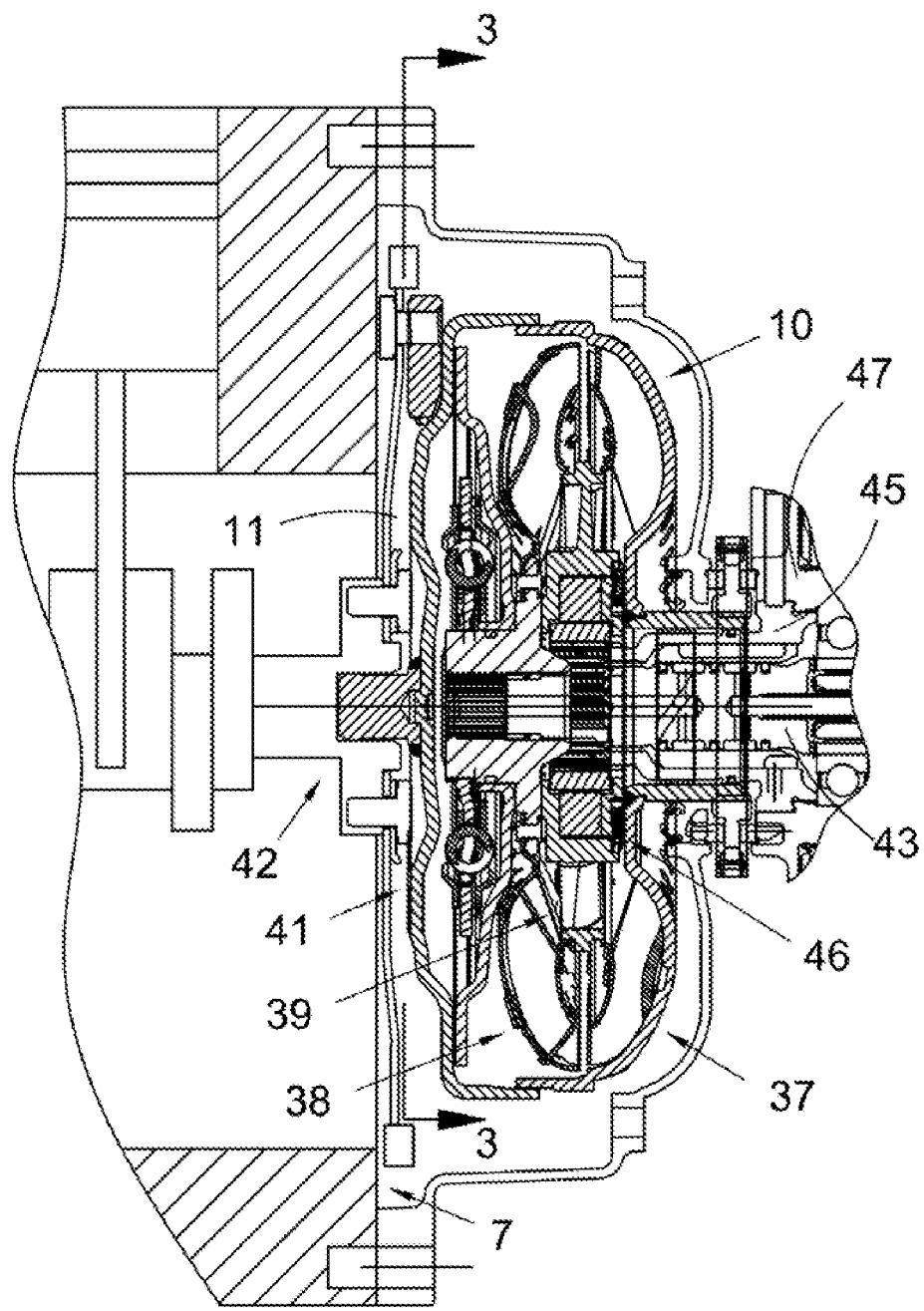
FIG. 2 is a cross-sectional view of a prior art torque converter, shown secured to an engine of a motor vehicle.
Figure 3:
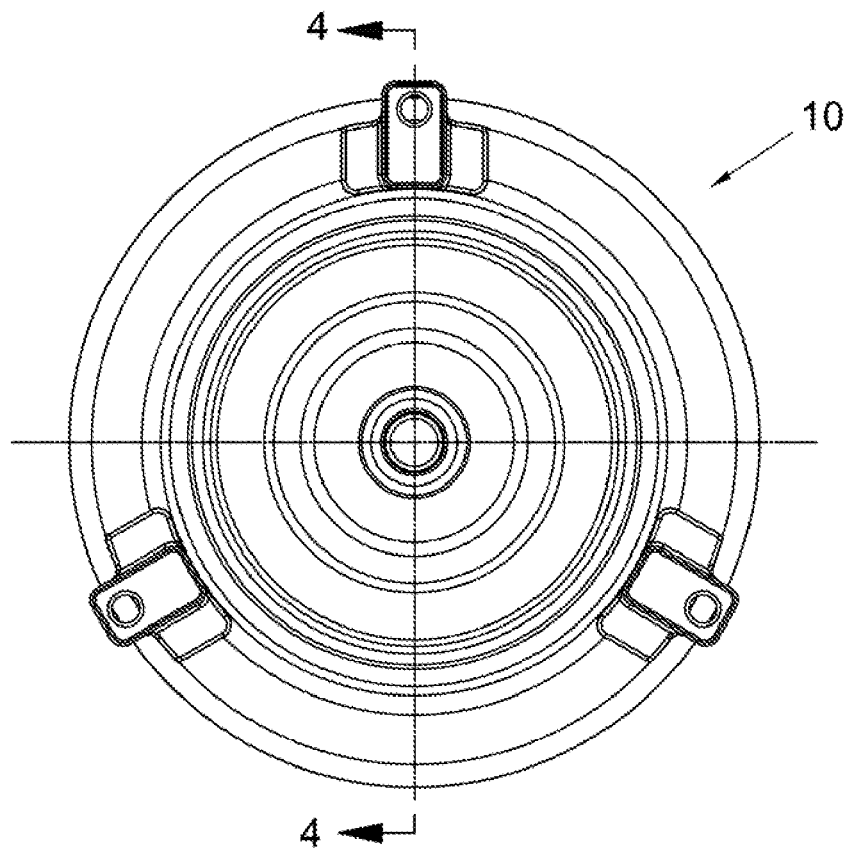
FIG. 3 is a left view of the torque converter shown in FIG. 2, taken generally along line 3-3 in FIG. 2.
Figure 4:
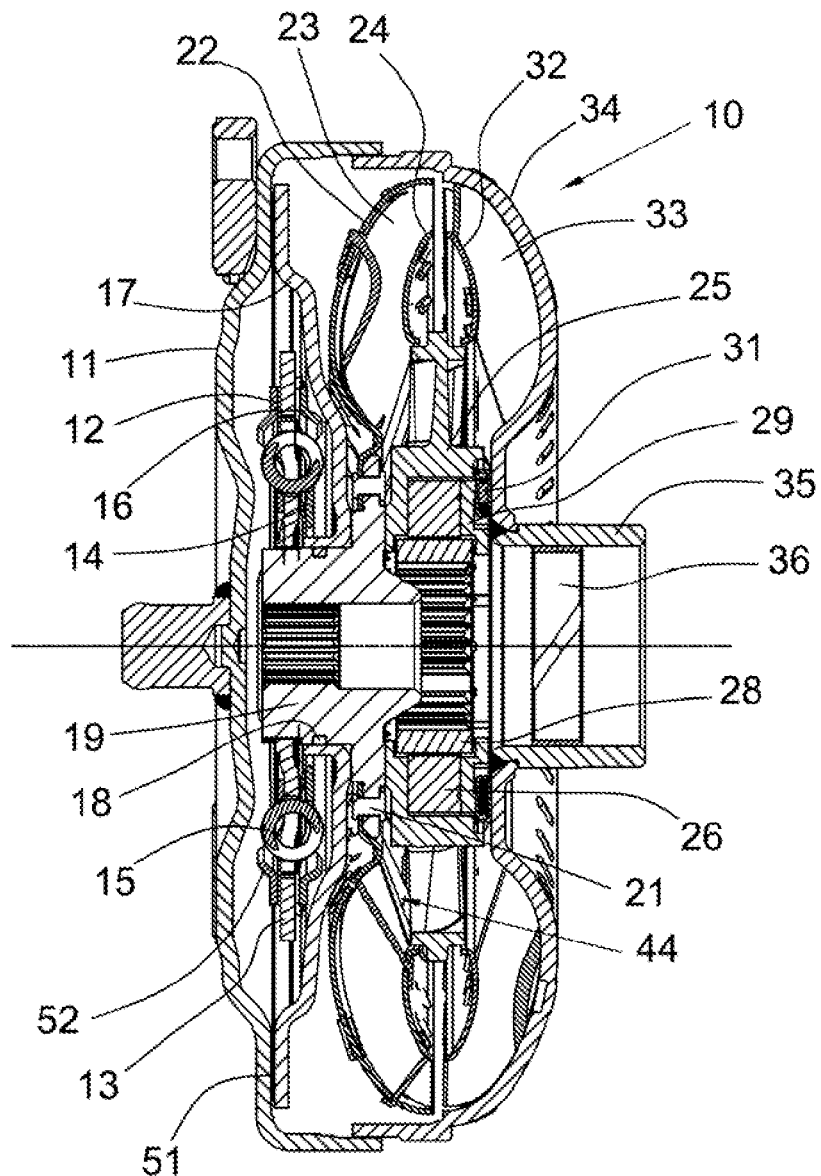
FIG. 4 is a cross-sectional view of the torque converter shown in FIGS. 2 and 3, taken generally along line 4-4 in FIG. 3.
Figure 5:
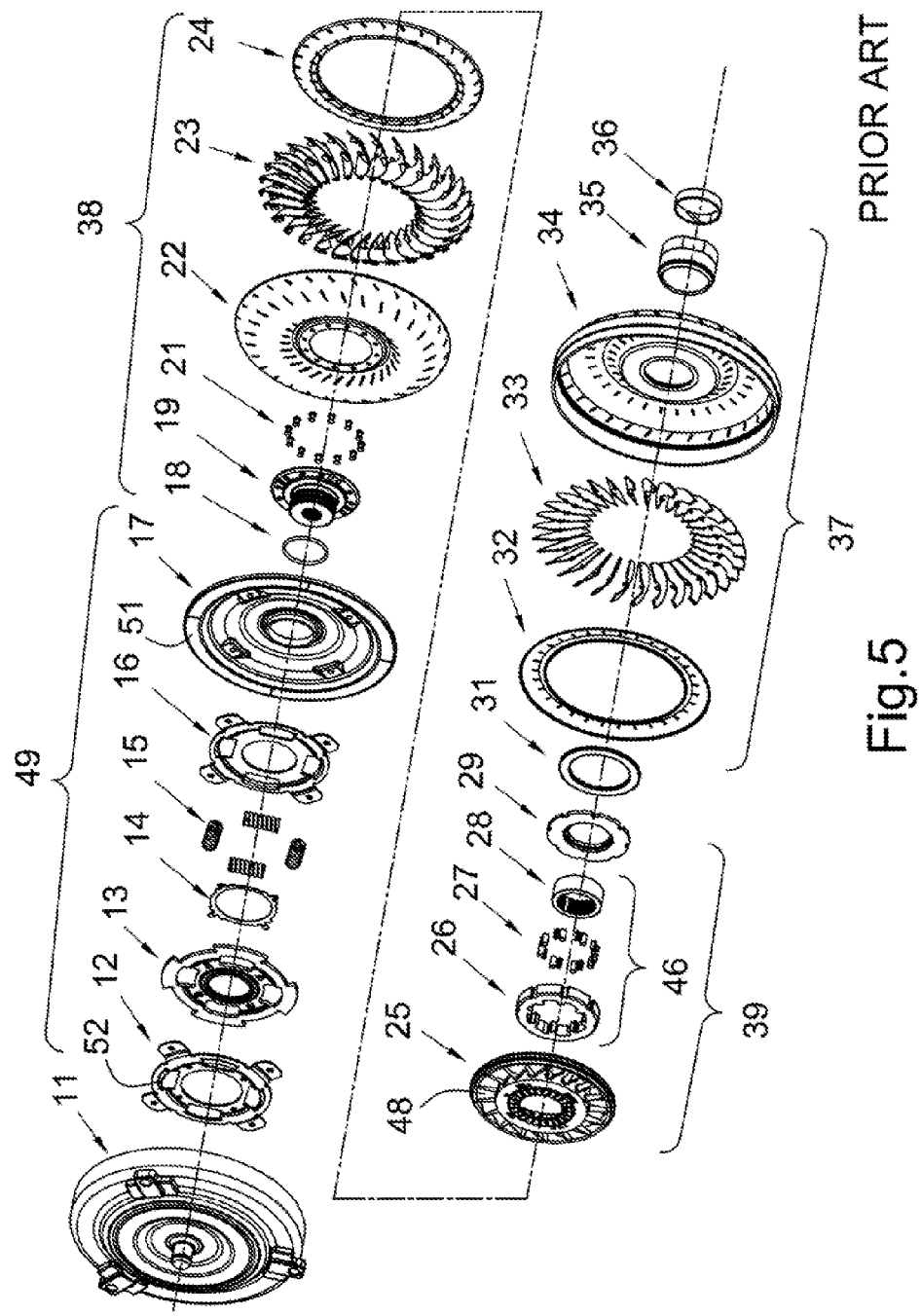
FIG. 5 is a first exploded view of the torque converter shown in FIG. 2, as shown from the perspective of one viewing the exploded torque converter from the left.
Figure 6:
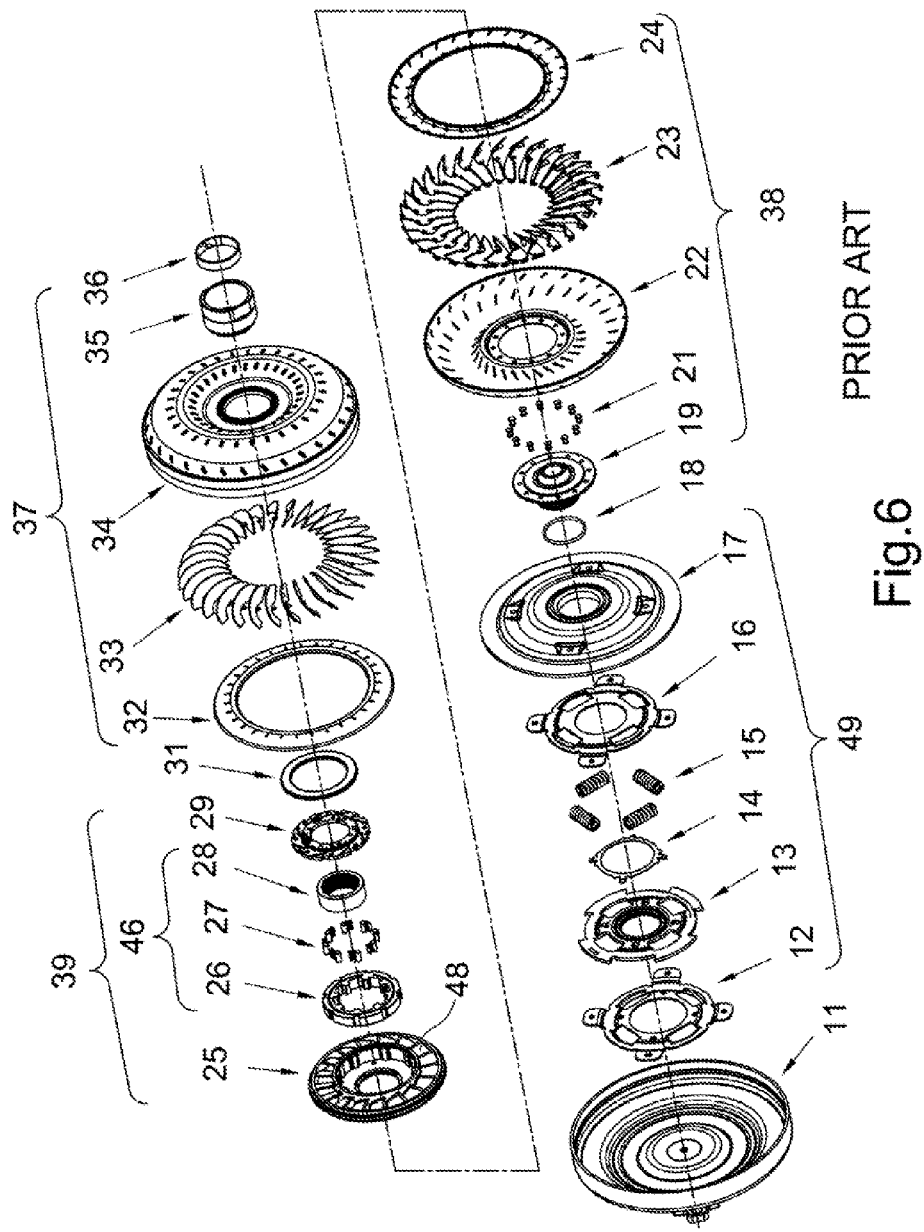
FIG. 6 is a second exploded view of the torque converter shown in FIG. 2, as shown from the perspective of one viewing the exploded torque converter from the right.
Figure 7A:
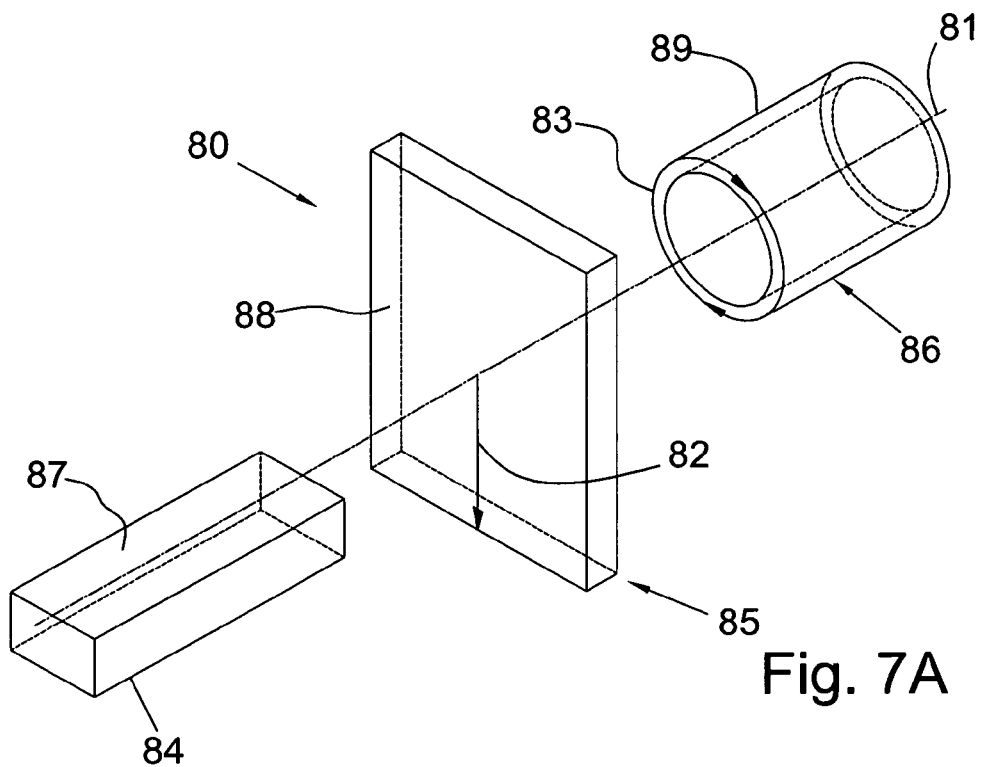
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
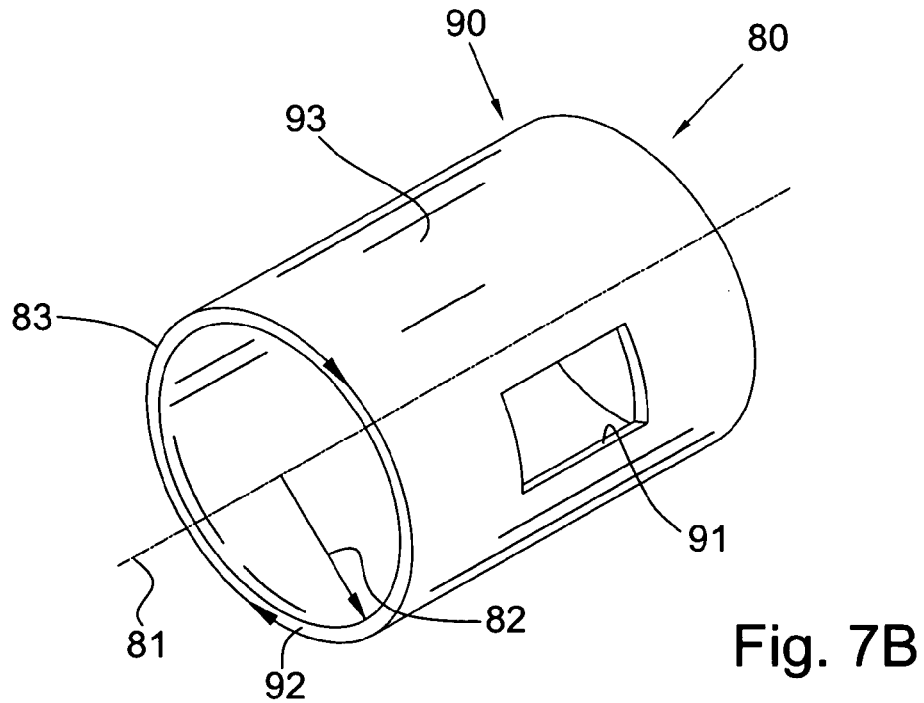
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
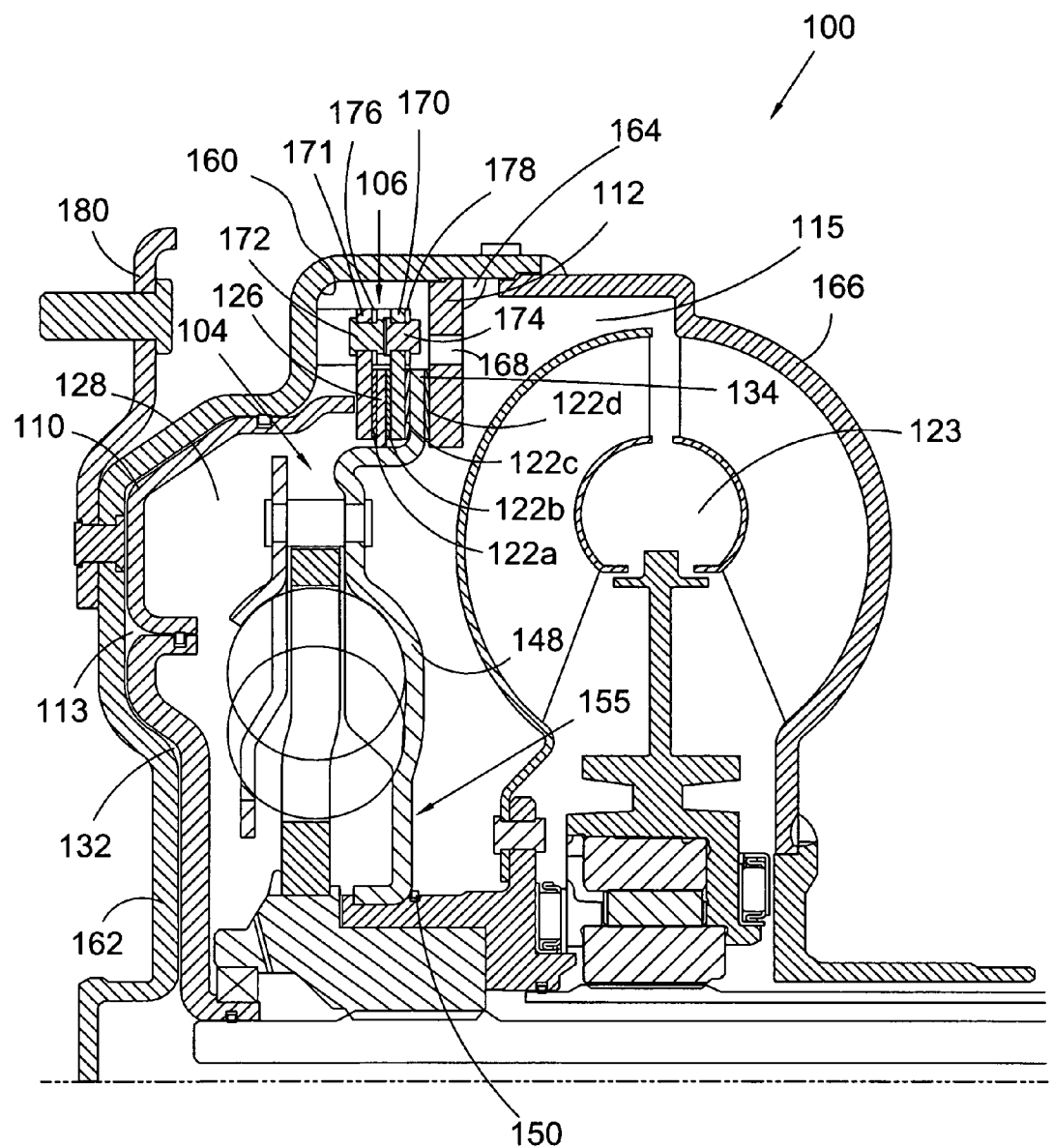
FIG. 8 is a partial cross-sectional view of a present invention torque converter with a multi-function damper cover plate.

FIG. 8 is present invention torque converter 100 with a multi-function damper cover plate. Torque converter 100 includes clutch 106 and damper 104. Damper 104 includes cover plate 155 with a sealed spring area 148 which forms a portion of chambers 115 and 128, that is, the cover plate forms a portion of the boundaries for the chambers. Release chamber 128 also is partially formed, or bounded, by piston plate 110. Cover plate 155 is rotationally connected to clutch 106. By rotationally connected, or secured, we mean that the plate and the clutch are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

In some aspects, the cover plate is a friction plate for the clutch, for example, portion 134 acts as a friction plate. In some aspects, (not shown), the cover plate is connected to a separate friction plate for the clutch. In some aspects, clutch 106 includes friction plate 126 rotationally connected to plate 155. It should be understood that clutch 106 is not limited to a particular number of friction plates rotationally connected to plate 155. The clutch also includes friction material 122. Any type of friction material known in the art can be used. The friction material can be configured in any manner known in the art. For example, the friction material can be fastened to another component, such as friction plate 126, or can be separate elements that are disposed between other components, such as between friction plate 155 and backing plate 112. Backing plate 112 is fixedly secured to inside surface 160 of cover 162 by any means known in the art, for example, weld 164. In some aspects (not shown), the backing plate is connected to pump shell 166. Plate 112 transmits torque from the cover to clutch 106 and also reacts the pressure applied by plate 110 to close the clutch. Torque transmission occurs through the clutch when the fluid pressure in chamber 113 is greater than the fluid pressure in chamber 128, such that piston plate 110 is axially displaced towards backing plate 112.

Cover plate 155 is also sealed to the turbine hub with seal 150, which also forms a portion of chamber 115. Since cover plate 155 has sealed spring area 148 it is advantageously unnecessary to have a sealing plate, thereby reducing the axial space necessary in the torque converter.

Chamber 115 is in fluid communication with torus 123 and chamber 128. When the clutch is open, cooling fluid (not shown) flows from chamber 128, between the friction material to chamber 115 and the torus, providing a cooling flow for the torus. When the clutch is closed, the cooling fluid is arranged to flow from pressure chamber 128 through the friction material, for example, through grooves in the friction material, to chamber 115 and the torus. In some aspects, the cooling flow is reversed, that is, the cooling fluid flows from the torus to chamber 115 to chamber 128. Thus, torque converter 100 provides an advantageous cooling flow through the friction material, enhancing the performance and durability of the friction material, while continuing to supply cooling flow to the torus. In some aspects, backing plate 112 includes orifice 168 arranged to enable a flow of cooling fluid from chamber 128 through the friction material to chamber 115 and the torus. For example, the orifice provides a dimensionally stable passageway for the flow.

The operation of chamber 113, the apply pressure chamber for the clutch, is independent of the operation of chambers 115 and 128. Specifically, the charging and venting of chamber 113, and hence the operation of clutch 106 is performed independent of the pressure and cooling fluid flow through chambers 115 and 128 and the torus. For example, chamber 113 is charged without interrupting the pressure in chambers 115 and 128, since chamber 113 is independently supplied with cooling fluid through channel 132. Therefore, chamber 128 continues to provide cooling fluid through the clutch friction material to chamber 115 and the torus during lock-up mode.

Friction plates 171 and 170 are connected to cover 162 by any means known in the art. In some aspects, fasteners 172 and 174 are used to connect the plates to springs 176 and 178, respectively. Any fastener known in the art can be used, including, but not limited to rivets. The springs are fixed to cover 162 and transmit engine torque from the cover to the respective friction plates. The cover is connected to an engine or flexplate (not shown), by any means known in the art, for example, drive plate 180. In some aspects (not shown), a spline arrangement is used to connect plates 126 and 170 to the cover. Advantageously, the use of a spring connection instead of a spline connection reduces undesirable vibration that is inherent in the use of the spline connection. Friction material 122a is disposed between plates 171 and 126. Friction material 122b is disposed between plates 126 and 170. Friction material 122c is disposed between plates 170 and portion 134. Friction material 122d is disposed between portion 134 and backing plate 112.

In some aspects, sealed spring area 148 is not used, but is replaced by a standard cover plate with spring windows and layered with a membrane. The membrane (not shown) may be riveted to the cover plate so that both cover plates of damper 104 are similar.

Figure 9:
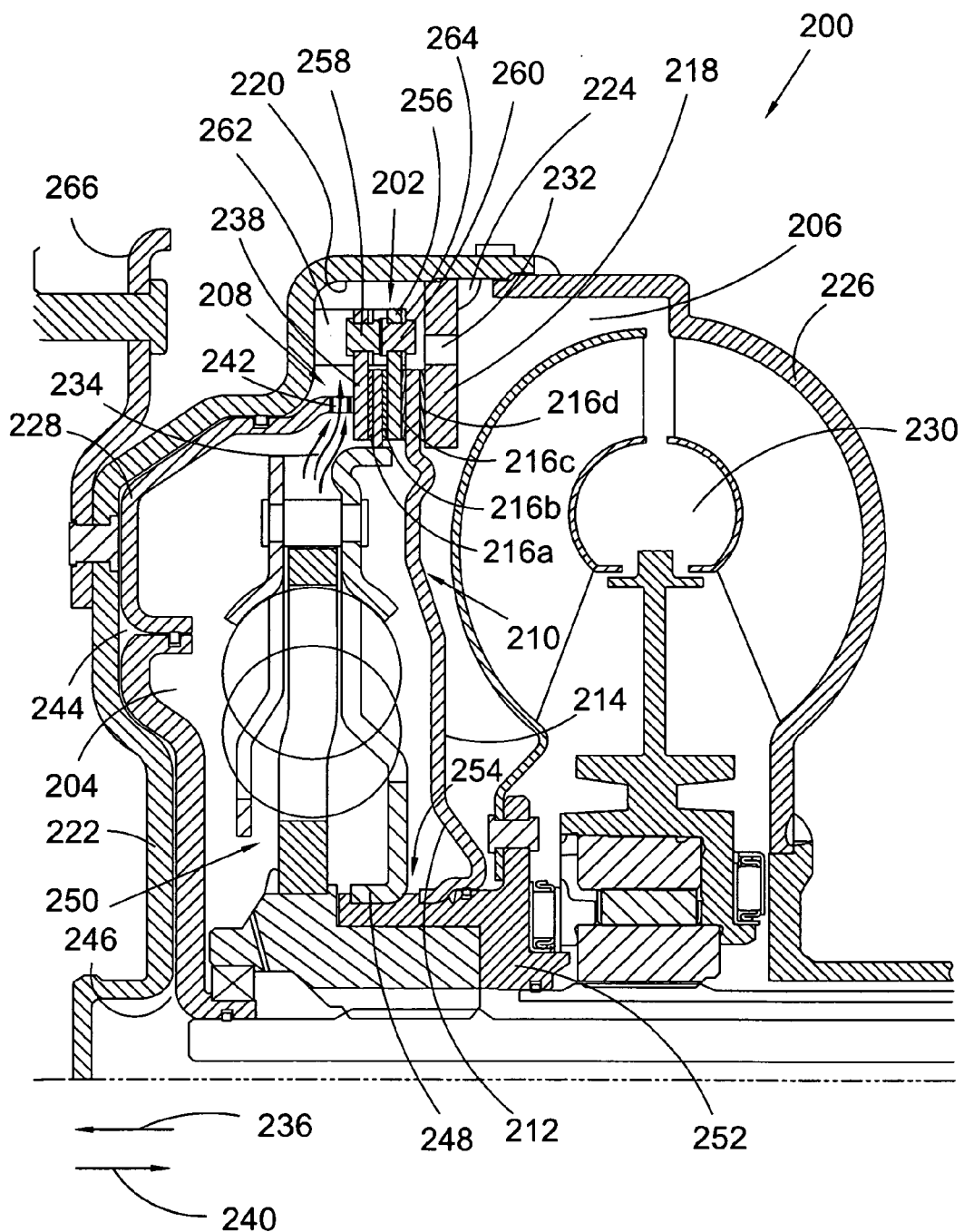
FIG. 9 is a partial cross-sectional view of a present invention torque converter with a pressure chamber flow control element.

FIG. 9 is a partial cross-sectional view of present invention torque converter 200 with a compressible resilient element. Converter 200 includes torque converter clutch 202, pressure chambers 204 and 206, and flow-control element 208. Clutch 202 includes friction/sealing plate 210 having surface 212 forming a portion of a boundary for pressure chamber 204 and surface 214 forming a portion of a boundary for a pressure chamber 206. The flow-control element is arranged to regulate a pressure or flow for cooling fluid (not shown) in chamber 204 to regulate a differential between pressure on the surface 212 and 214 from chambers 204 and 206, respectively.

The clutch also includes friction material 216. Any type of friction material known in the art can be used. The friction material can be configured in any manner known in the art. For example, the friction material can be fastened to another component, such as friction plate 210, or can be separate elements that are disposed between other components, such as between friction plate 210 and backing plate 218. Backing plate 218 is fixedly secured to inside surface 220 of cover 222 by any means known in the art, for example, weld 224. In some aspects (not shown), the backing plate is connected to pump shell 226. Plate 218 transmits torque from the cover to clutch 202 and also reacts the pressure applied by piston plate 228 to close the clutch. As further described infra, when the clutch is closed, that is, converter 200 is operating in lock-up mode, the flow-control element blocks flow of cooling fluid out of chamber 204 through the flow-control element.

Chamber 206 is in fluid communication with chamber 204 and torus 230. When the clutch is open, that is, the torque converter is operating in torque converter mode and the cooling requirements for the torus are greatest, cooling fluid (not shown) flows from chamber 204, between the friction material to chamber 206 and the torus, providing a cooling flow for the torus. Advantageously, when the clutch is open, element 208 also is open, increasing the cooling flow from chamber 204 to the torus. When the clutch is closed, that is, the torque converter is operating in lock-up mode and the cooling requirements for the friction material are greatest, the cooling fluid is arranged to flow from pressure chamber 204 through the friction material, for example, through grooves in the friction material, to the pressure chamber 206 and the torus. Advantageously, element 208 is closed in lock-up mode, increasing cooling flow from chamber 204 through the friction material. In some aspects, the cooling flow is reversed, that is, the cooling fluid flows from the torus to chamber 206 to chamber 204. Thus, torque converter 200 provides an advantageous cooling flow through the friction material, enhancing the performance and durability of the friction material, while continuing to supply cooling flow to the torus. In some aspects plate 218 includes orifice 232 arranged to enable a flow of cooling fluid from chamber 204 through the friction material to chamber 206 and the torus. For example, the orifice provides a dimensionally stable passageway for the flow.

When clutch 202 is open, flow-control element 208 enables flow 234 of cooling fluid out of chamber 204 through the flow-control element, for example, as described supra, to create a predetermined differential between the pressure of the cooling fluid in chamber 204 on surface 212 and the pressure of the cooling fluid in chamber 206 on surface 214. In particular, the flow through element 208 enables a balancing of the respective pressures on surfaces 212 and 214, addressing the drag problem noted supra. That is, balancing the pressures advantageously reduces drag between the friction plate 210, and the backing plate.

In some aspects, element 208 is a compressible resilient element disposed between piston plate 228 and drive plate 238. The compressible resilient element is arranged to regulate the flow of cooling fluid from the release chamber to the torus. In some aspects, the resilient element is a wave washer. However, it should be understood that any compressible resilient element known in the art can be used. The wave washer exerts axial pressure on plate 228 and plate 238. For example, the washer urges plate 228 in direction 236 and urges plate 238 in direction 240, opposite direction 236. That is, the wave washer urges plates 228 and 238 away from each other. When the clutch is open, the force exerted by the wave washer is sufficient to keep plates 228 and 238 apart, creating gap 242 between plates 228 and 238. Gap 242 enables fluid flow 234 from chamber 204 to chamber 206. When the clutch is closed, pressure in chamber 244 is sufficient to overcome the axial force exerted by the wave washer and the wave washer is compressed between plates 228 and 238, closing gap 242. Then, as described supra, fluid flow from chamber 204 is forced through frictional elements 216a/b/c to chamber 204.

The operation of chamber 244 is independent of the operation of chambers 204 and 206. Specifically, the charging and venting of chamber 244, and hence the operation of clutch 202 is performed independent of the pressure and cooling fluid flow through chambers 204 and 206 and the torus. For example, chamber 244 is charged without interrupting the pressure in chambers 204 and 206, since chamber 244 is independently supplied with cooling fluid through channel 246. Therefore, chamber 204 continues to provide cooling fluid through the clutch friction material to chamber 206 and the torus during lock-up mode.

Cover plate 248 of damper 250 is rotationally connected to turbine hub 252 via spline connection 254. Advantageously, friction plate 210 is rotationally connected to the turbine hub, so that in lock-up mode, plate 210 transmits engine torque to the turbine hub, which 'preloads' the turbine hub, eliminating the vibration and noise problem noted supra. That is, plate 210 transmits engine torque to the turbine hub, which otherwise is carrying little or no torque, locking the spline connection between plate 210 and hub 252. That is, contact between the plate and the hub is maintained in the spline connection. The connection of a torque converter clutch to a turbine hub is further described in commonly-owned U.S. Provisional Patent Application No. 60/816,932, filed Jun. 28, 2006, which is incorporated by reference herein.

Friction plates 238 and 256 are connected to cover 222 by any means known in the art. In some aspects, fasteners 258 and 260 are used to connect the plates to springs 262 and 264, respectively. Any fastener known in the art can be used, including, but not limited to rivets. The springs are fixed to cover 222 and transmit engine torque from the cover to the respective friction plates. The cover is connected to an engine or flexplate (not shown), by any means known in the art, for example, drive plate 266. In some aspects (not shown), a spline arrangement is used to connect plates 238 and 256 to the cover. Advantageously, the use of a spring connection instead of a spline connection reduces undesirable vibration that is inherent in the use of the spline connection.

Figure 10:
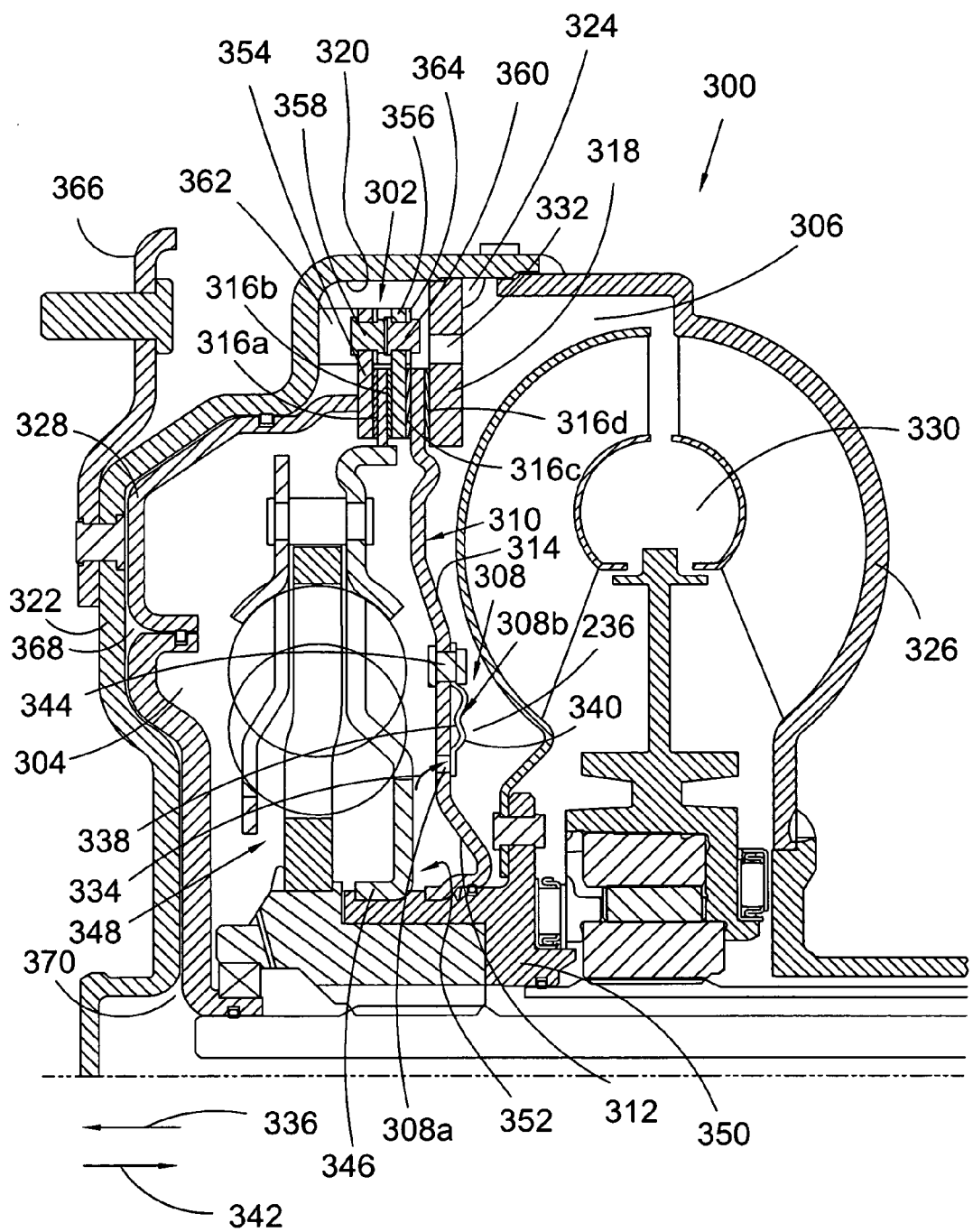
FIG. 10 is a partial cross-sectional view of a present invention torque converter with a pressure chamber flow control element.

FIG. 10 is a partial cross-sectional view of present invention torque converter 300 with an orifice and pressure-controllable flap. Converter 300 includes torque converter clutch 302, pressure chambers 304 and 306, and flow-control element 308. Clutch 302 includes friction plate 310 having surface 312 forming a portion of a boundary for pressure chamber 304 and surface 314 forming a portion of a boundary for a pressure chamber 306. The flow-control element is arranged to regulate a pressure and flow for cooling fluid (not shown) in chamber 304 to regulate a differential between pressure on the surface 312 and 314 from chambers 304 and 306, respectively.

The clutch also includes friction material 316. Any type of friction material known in the art can be used. The friction material can be configured in any manner known in the art. For example, the friction material can be fastened to another component, such as friction plate 310, or can be separate elements that are disposed between other components, such as between friction plate 310 and backing plate 318. Backing plate 318 is fixedly secured to inside surface 320 of cover 322 by any means known in the art, for example, weld 324. In some aspects (not shown), the backing plate is connected to pump shell 326. Plate 318 transmits torque from the cover to clutch 302 and also reacts the pressure applied by piston plate 328 to close the clutch. As further described infra, when the clutch is closed, that is, converter 300 is operating in lock-up mode, the flow-control element blocks flow of cooling fluid out of chamber 304 through the flow-control element.

Chamber 306 is in fluid communication with chamber 304 and torus 330. When the clutch is open, that is, the torque converter is operating in torque converter mode and the cooling requirements for the torus are greatest, cooling fluid (not shown) flows from chamber 304, between the friction material to chamber 306 and the torus, providing a cooling flow for the torus. Advantageously, when the clutch is open, element 308 also is open, increasing the cooling flow from chamber 304 to the torus. When the clutch is closed, that is, the torque converter is operating in lock-up mode and the cooling requirements for the friction material are greatest, the cooling fluid is arranged to flow from the torus to pressure chamber 306 and through the friction material, for example, through grooves in the friction material, to pressure chamber 304. Advantageously, element 308 is closed in lock-up mode, increasing cooling flow from chamber 306 through the friction material. Thus, torque converter 300 provides an advantageous cooling flow through the friction material, enhancing the performance and durability of the friction material, while continuing to supply cooling flow to the torus. In some aspects plate 318 includes orifice 332 arranged to enable a flow of cooling fluid from chamber 306 through the friction material to chamber 304. For example, the orifice provides a dimensionally stable passageway for the flow.

When clutch 302 is open, flow-control element 308 enables flow 334 of cooling fluid out of chamber 304 through the flow-control element, for example, as described supra, to create a predetermined differential between the pressure of the cooling fluid in chamber 304 on surface 312 and the pressure of the cooling fluid in chamber 306 on surface 314. In particular, the flow through element 308 enables the balancing of the respective pressures on surfaces 312 and 314, addressing the drag problem noted supra. That is, balancing the pressures advantageously reduces drag between friction plate 310, the backing plate, and material 316d, thereby increasing the efficiency of converter 300.

In some aspects, element 308 is orifice 308a and pressure-controllable flap 308b for the release chamber. The orifice and flap are arranged to regulate the flow of cooling fluid between chambers 304 and 306. By pressure-controllable, we mean that depending on the pressure differential acting on surfaces 338 and 340 of the flap, the flap is either displaced away from the orifice (approximately in direction 342), enabling flow through the orifice, or is urged against the orifice (approximately in direction 336), sealing the orifice and blocking flow through the orifice. Any orifice and flap arrangement known in the art can be used. In some aspects, the orifice is disposed in plate 310 and flap 308b is a spring connected to plate 310 by any means known in the art, for example, rivet 344. However, it should be understood that the orifice is not limited to only location shown in FIG. 10. The orifice and flap can consist of a single or multiple orifices, single or multiple flaps, or a combination of single and multiple orifices and flaps.

Spring 308b is preloaded with a certain force such that the spring is urged against plate 310, closing the orifice. In torque converter mode, the spring is moved in direction 342, opening the orifice, when pressure in chamber 304 is greater than the force of the spring preload in combination with the pressure in chamber 306. Thus, force acting on plate 310 in direction 342, which undesirably causes plate 310 to drag on the backing plate, is limited by the amount of preload force for the spring. In lock-up mode, cooling fluid is forced into chamber 306 from the torus, closing the flap. Thus, cooling flow from chamber 306 is fully directed to flow through friction material 316 to chamber 304.

Cover plate 346 of damper 348 is rotationally connected to turbine hub 350 via spline connection 352. Advantageously, friction plate 310 is rotationally connected to the turbine hub, so that in lock-up mode, plate 310 transmits engine torque to the turbine hub, which 'preloads' the turbine hub, eliminating the vibration and noise problem noted supra. That is, plate 310 transmits engine torque to the turbine hub, which otherwise is carrying little or no torque, locking the spline connection between plate 310 and hub 350. That is, contact between the plate and the hub is maintained in the spline connection. The connection of a torque converter clutch to a turbine hub is further described in commonly-owned U.S. Provisional Patent Application No. 60/816,932, filed Jun. 28, 2006, which is incorporated by reference herein.

Friction plates 354 and 356 are connected to cover 322 by any means known in the art. In some aspects, fasteners 358 and 360 are used to connect the plates to springs 362 and 364, respectively. Any fastener known in the art can be used, including, but not limited to rivets. The springs are fixed to cover 322 and transmit engine torque from the cover to the respective friction plates. The cover is connected to an engine or flexplate (not shown), by any means known in the art, for example, drive plate 366. In some aspects (not shown), a spline arrangement is used to connect plates 354 and 356 to the cover. Advantageously, the use of a spring connection instead of a spline connection reduces undesirable vibration that is inherent in the use of the spline connection.

The operation of chamber 368, the apply chamber for the clutch, is independent of the operation of chambers 304 and 306. Specifically, the charging and venting of chamber 368, and hence the operation of clutch 302 is performed independent of the pressure and cooling fluid flow through chambers 304 and 306 and the torus. For example, chamber 368 is charged without interrupting the pressure in chambers 304 and 306, since chamber 368 is independently supplied with cooling fluid through channel 370. Therefore, chamber 306 continues to provide cooling fluid from the torus through the clutch friction material to chamber 304 during lock-up mode.

Figure 11:
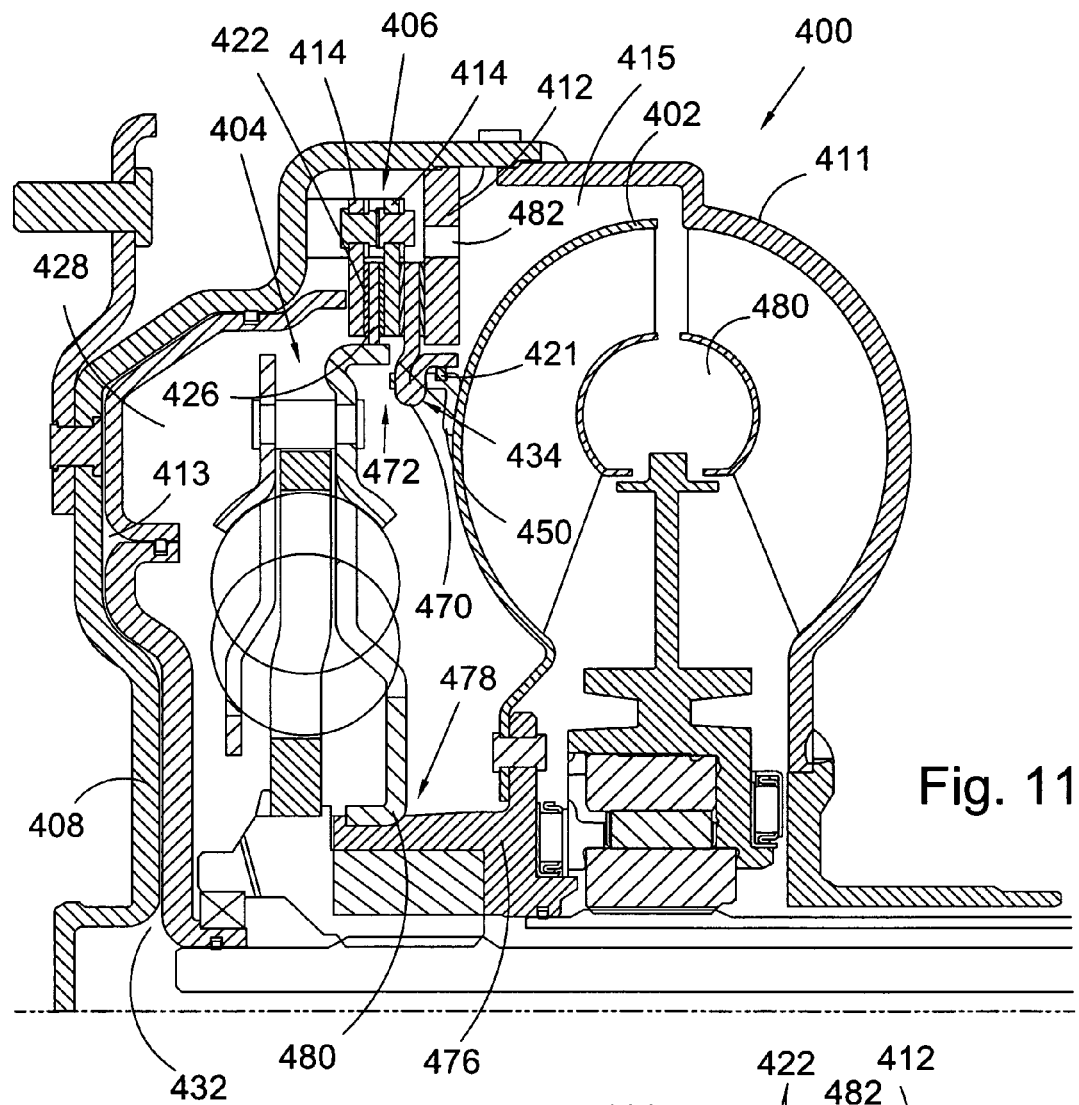
FIG. 11 is a partial cross-sectional view of a present invention torque converter with a turbine shell rotationally connected to a torque converter clutch.

FIG. 11 is a partial cross-sectional view of present invention torque converter 400 with a turbine shell rotationally connected to a torque converter clutch. Torque converter 400 includes torque converter clutch 406 with carrier 450 rotationally connected to turbine shell 402 by any means known in the art. In some aspects, to eliminate lash between the carrier and the shell, the carrier is fixedly secured to the shell by any means known in the art, for example, welding or riveting.

Backing plate 412 is an annular plate fixed to an inside surface of cover 408 by any means known in the art, for example, welding. However, it should be noted that backing plate 412 could be fixed to an inside surface of a pump shell 411. Clutch 406 also includes friction plates 414, damper engagement plate 426, and friction plate 434 rotationally engaged with the carrier by any means known in the art, for example, via bent sections 470 engaged with respective openings 472 in the carrier. Seal 421 between plate 434 and the carrier forms a portion of the boundary between chambers 428 and 415. Since plate 434 and the carrier are rotationally connected, seal 421 can be a static seal, that is, a more expensive dynamic seal is not needed.

During lock-up mode for the torque converter, for example, when clutch 406 is closed, clutch 406 is arranged to transmit torque to turbine hub 476 via carrier 450 and turbine shell 402. The torque from the clutch 'preloads' the turbine hub, eliminating the vibration and noise problem noted supra. That is, carrier 450 transmits engine torque to the turbine hub, which otherwise is carrying little or no torque, locking connection 478, typically a spline connection, between cover plate 480 of damper 404 and the turbine hub. That is, contact between the plate and the hub is maintained in the spline connection. The connection of a torque converter clutch and a damper to a turbine hub is further described in commonly-owned U.S. Provisional Patent Application No. 60/816,932, filed Jun. 28, 2006, which is incorporated by reference herein.

Chamber 415 is in fluid communication with chamber 428 and torus 480. When the clutch is open, cooling fluid (not shown) flows from chamber 428, between friction material 422 for the clutch to chamber 415 and the torus, providing a cooling flow for the torus. When the clutch is closed, the cooling fluid is arranged to flow from pressure chamber 428 through friction material 422, for example, through grooves in the friction material, to chamber 415 and the torus. In some aspects, the cooling flow is reversed, that is, the cooling fluid flows from the torus to chamber 415 to chamber 428. Thus, torque converter 400 provides an advantageous cooling flow through the friction material, enhancing the performance and durability of the friction material, while continuing to supply cooling flow to the torus. In some aspects, backing plate 412 includes orifice 482 arranged to enable a flow of cooling fluid from chamber 428 through the friction material to chamber 415 and the torus. For example, the orifice provides a dimensionally stable passageway for the flow.

The operation of chamber 413 is independent of the operation of chambers 415 and 428. Specifically, the charging and venting of chamber 413, and hence the operation of clutch 406 is performed independent of the pressure and cooling fluid flow through chambers 415 and 428 and the torus. For example, chamber 413 is charged without interrupting the pressure in chambers 415 and 428, since chamber 413 is independently supplied with cooling fluid through channel 432. Therefore, chamber 428 continues to provide cooling fluid through the clutch friction material to chamber 415 and the torus during lock-up mode.

Any type of friction material 422 known in the art can be used. The friction material can be configured in any manner known in the art. For example, the friction material can be fastened to another component, such as a friction plate, or can be separate elements that are disposed between other components, such as between friction plates.

The overall configuration and operation of the torque converter clutch, the interconnection of components of the clutch, and the connection of the clutch to cover 408 is substantially as described for clutch 202 in FIG. 9, except as noted infra.

Figure 12:
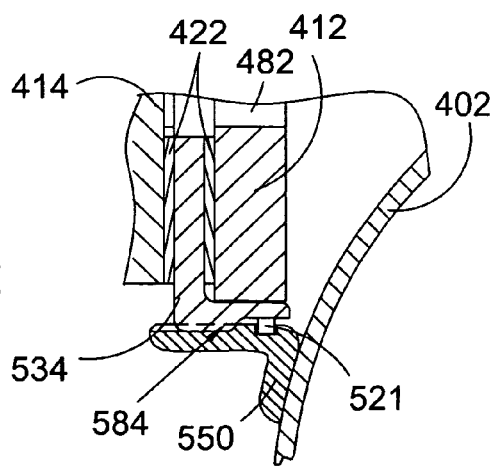
FIG. 12 is a detail showing a variation of the torque clutch arrangement shown in FIG. 11.

FIG. 12 is a detail showing a variation of the torque clutch arrangement shown in FIG. 11. The following should be viewed in light of FIGS. 11 and 12. Carrier 550 is connected to shell 402 as described for carrier 450. However, the rotational connection between friction plate 534 and the carrier is different than shown for plate 434 and the carrier in FIG. 11. For example, in some aspects plate 534 and the carrier are connected by spline connection 584.

Figure 13:
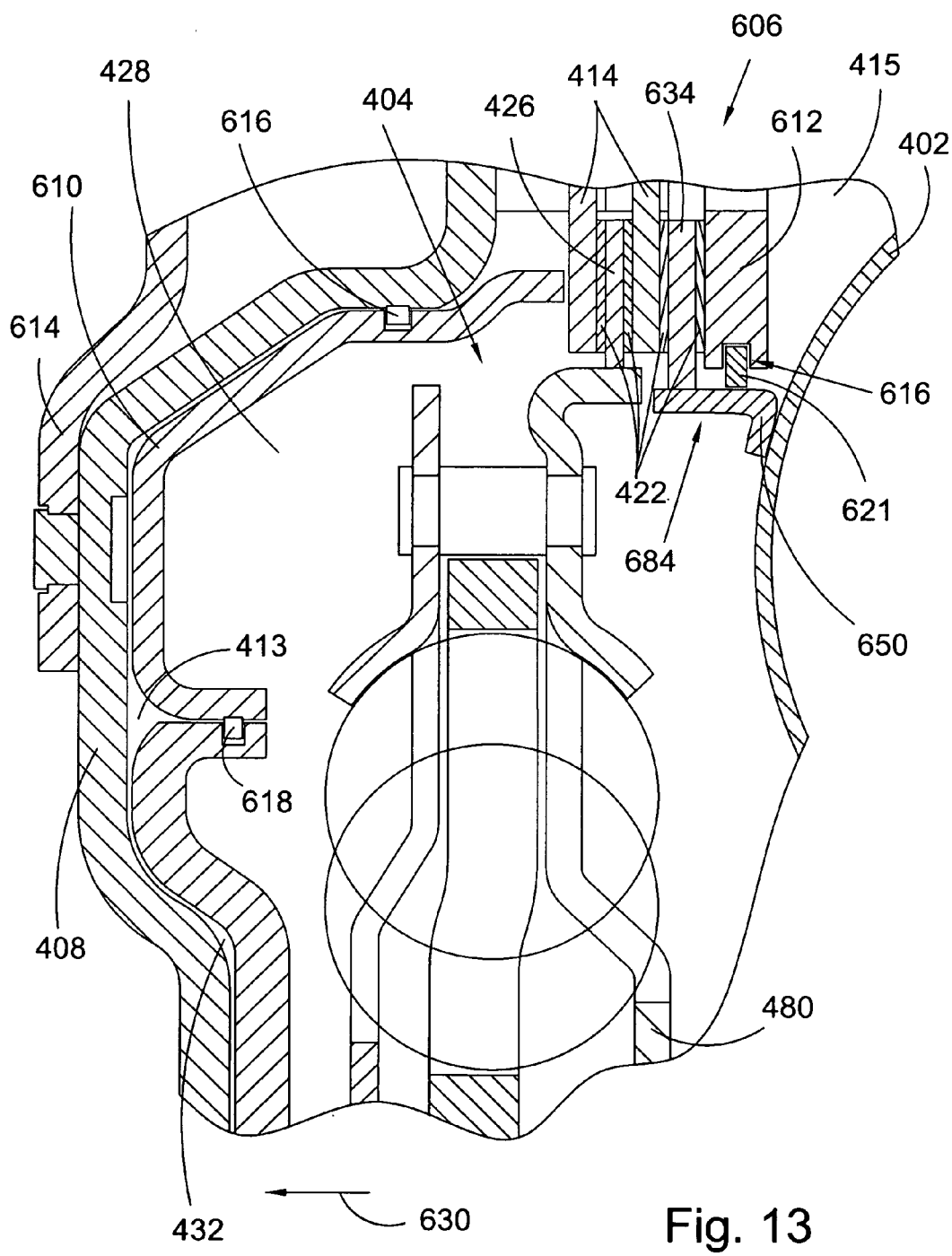
FIG. 13 is a detail showing a variation of the torque clutch arrangement shown in FIG. 11.

FIG. 13 is a detail showing a variation of the torque clutch arrangement shown in FIG. 11. The following should be viewed in light of FIGS. 11 and 13. Carrier 650 is connected to shell 402 as described for carrier 450. However, the rotational connection between friction plate 634 and the carrier is different than shown for plate 434 and the carrier in FIG. 11. Backing plate 612 extends radially inward with slot 616 at the inside radius of the backing plate. Seal 621 extends inwards from slot 616. Seal 621 is a dynamic seal, enabling carrier 650 and backing plate 612 to rotate at different speeds. Plate 634 is rotationally connected to carrier 650 by any means known in the art, for example, spline connection 684.

Figure 14:
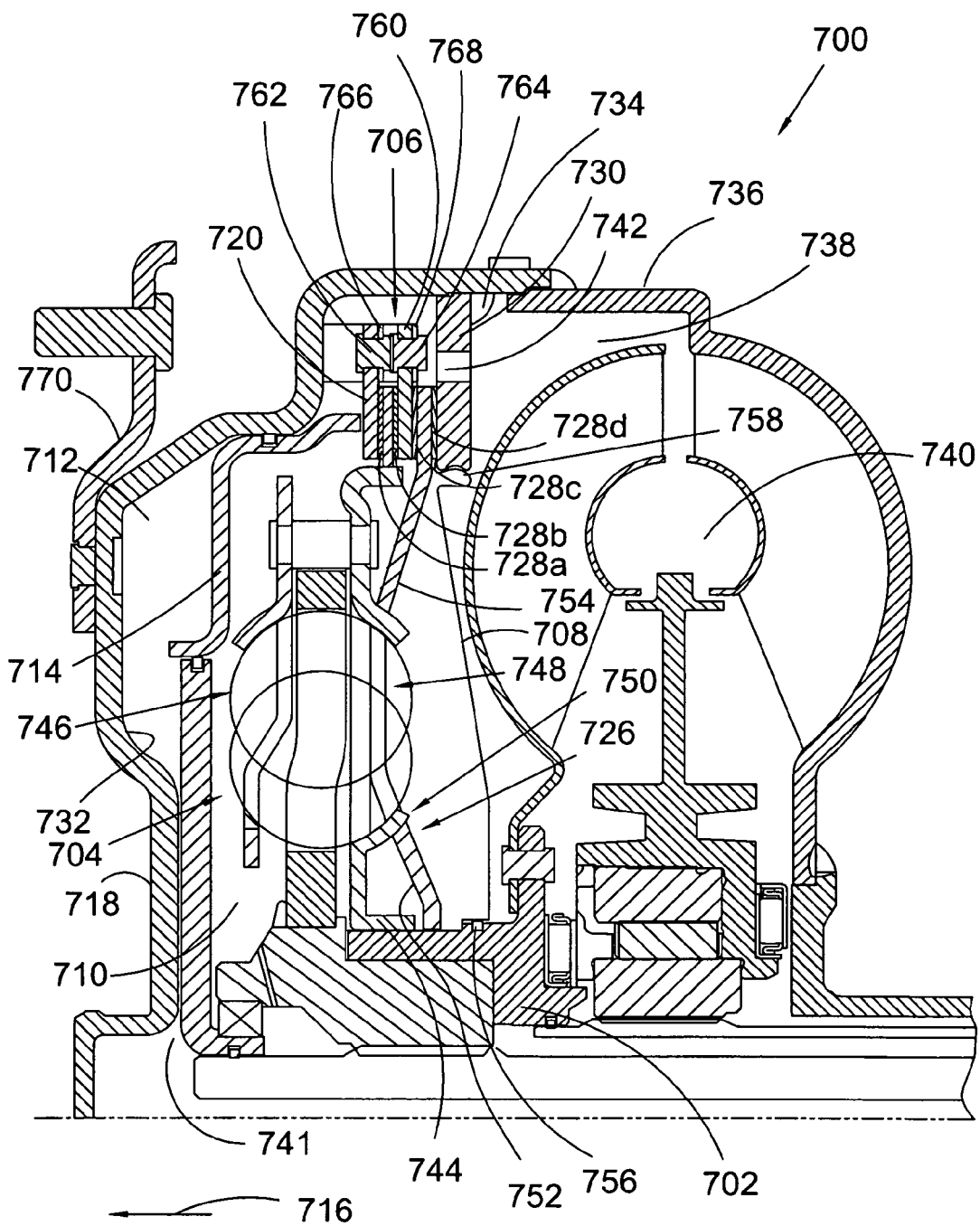
FIG. 14 is a partial cross-sectional view of a present invention torque converter with a membrane forming a portion of a pressure chamber; and, FIG. 15 is a partial cross-sectional view of a present invention torque converter.

FIG. 14 is a partial cross-sectional view of present invention torque converter 700 with a membrane. Converter 700 includes turbine hub 702, damper element 704 rotationally connected to the turbine hub, torque converter clutch 706 rotationally connected to the damper element and to the turbine hub, and membrane 708. The membrane forms a portion of chamber 710 for the clutch. By forming a portion of chamber 710, we mean that membrane 708 forms at least a portion of a boundary for the chamber. That is, the membrane forms a portion of the exterior of the chamber in comparison to being wholly disposed within the chamber.

During lock-up mode for the torque converter, for example, when clutch 706 is closed, clutch 706 is arranged to transmit torque to the turbine hub, advantageously enabling the transmission of engine torque from clutch 706 to turbine hub 702 during operation in lock-up mode for converter 700. In some aspects, the clutch includes friction plate 726 rotationally connected to the turbine hub and arranged to transmit the torque to the turbine hub during the lock-up mode. The connection of a torque converter clutch to a turbine hub is described in commonly-owned U.S. Provisional Patent Application No. 60/816,932, filed Jun. 28, 2006, which is incorporated by reference herein.

The clutch also includes friction material 728. Any type of friction material known in the art can be used. The friction material can be configured in any manner known in the art. For example, the friction material can be fastened to another component, such as friction plate 726, or can be separate elements that are disposed between other components, such as between friction plate 726 and backing plate 730. Backing plate 730 is fixedly secured to inside surface 732 of cover 718 by any means known in the art, for example, weld 734. In some aspects (not shown), the backing plate is connected to pump shell 736. Plate 730 transmits torque from the cover to clutch 706 and also reacts the pressure applied by plate 714 to close the clutch.

Torque converter 700 also includes pressure chamber 738 and torus 740. Chamber 738 is in fluid communication with chamber 710 and the torus. When the clutch is open, cooling fluid (not shown) flows from chamber 710, between the friction material to chamber 738 and the torus, providing a cooling flow for the torus. When the clutch is closed, the cooling fluid is arranged to flow from pressure chamber 710 through the friction material, for example, through grooves in the friction material, to the pressure chamber 738 and the torus. In some aspects, the cooling flow is reversed, that is, the cooling fluid flows from the torus to chamber 738 to chamber 710. Thus, torque converter 700 provides an advantageous cooling flow through the friction material, enhancing the performance and durability of the friction material, while continuing to supply cooling flow to the torus. In some aspects plate 730 includes orifice 742 arranged to enable a flow of cooling fluid from chamber 710 through the friction material to chamber 738 and the torus. For example, the orifice provides a dimensionally stable passageway for the flow.

The operation of chamber 712, the apply pressure chamber for the clutch, is independent of the operation of chambers 710 and 738. Specifically, the charging and venting of chamber 712, and hence the operation of clutch 706 is performed independent of the pressure and cooling fluid flow through chambers 710 and 738 and the torus. For example, chamber 710 is charged without interrupting the pressure in chambers 710 and 738, since chamber 712 is independently supplied with cooling fluid through channel 741. Therefore, chamber 710 continues to provide cooling fluid through the clutch friction material to chamber 738 and the torus during lock-up mode.

Damper 704 includes cover plate 744, which retains springs 746. In some aspects, plate 726 is conformed to at least partially follow the contours of the cover plate and includes at least one opening 748 configured to accommodate spring windows 750 in plate 744. That is, springs 746 are partially disposed within openings 748, and subsequently, within plate 726. By following the contours of the cover plate and accommodating springs 746, plate 726 can advantageously be placed axially close to the damper, thereby reducing the axial space used by plate 726 in the torque converter.

Plate 726 includes oppositely oriented radial surfaces 752 and 754. Plate 726 is disposed within chamber 710. Therefore, in all torque converter modes, the respective pressures on surfaces 752 and 754 from cooling fluid in chamber 738 are advantageously substantially equal. Thus, the drag problem noted supra is resolved, since plate 726 is balanced (not urged in direction 716) by pressure in the chamber. Therefore, drag between plates 726 and 730 and material 728*d* is advantageously reduced. Alternately stated, in response to the substantially equal respective pressures the friction plate is positioned to minimize drag with the torque converter clutch, for example, during torque converter mode for the torque converter.

Membrane 708 is disposed between the backing plate and the turbine hub and forms a seal between the backing plate and the turbine hub. In some aspects, converter 700 includes dynamic seal 756 disposed between the membrane and the turbine hub. The use of a dynamic seal enables the membrane and hub 702 to rotate at different rates. In general, the membrane is rotationally connected to the backing plate by any means known in the art. In some aspects, clip 758, which is integral to the membrane, is used to connect the membrane to the backing plate. In some aspects (not shown), other fasteners, such as rivets are used to connect the membrane to the backing plate.

Cover plate 744 of damper 704 is rotationally connected to turbine hub 702 via a spline connection. Advantageously, friction plate 726 is rotationally connected to the turbine hub, so that in lock-up mode, plate 726 transmits engine torque to the turbine hub, which 'preloads' the turbine hub, eliminating the vibration and noise problem noted supra. That is, plate 726 transmits engine torque to the turbine hub, which otherwise is carrying little or no torque, locking the spline connection between plate 726 and hub 702. That is, contact between the plate and the hub is maintained in the spline connection. The connection of a torque converter clutch to a turbine hub is further described in commonly-owned U.S. Provisional Patent Application No. 60/816,932, filed Jun. 28, 2006, which is incorporated by reference herein.

Friction plates 720 and 760 are connected to cover 718 by any means known in the art. In some aspects, fasteners 762 and 764 are used to connect the plates to springs 766 and 768, respectively. Any fastener known in the art can be used, including, but not limited to rivets. The springs are fixed to cover 718 and transmit engine torque from the cover to the respective friction plates. The cover is connected to an engine or flexplate (not shown), by any means known in the art, for example, drive plate 770. In some aspects (not shown), a spline arrangement is used to connect plates 720 and 760 to the cover. Advantageously, the use of a spring connection instead of a spline connection reduces undesirable vibration that is inherent in the use of the spline connection.

Figure 15:
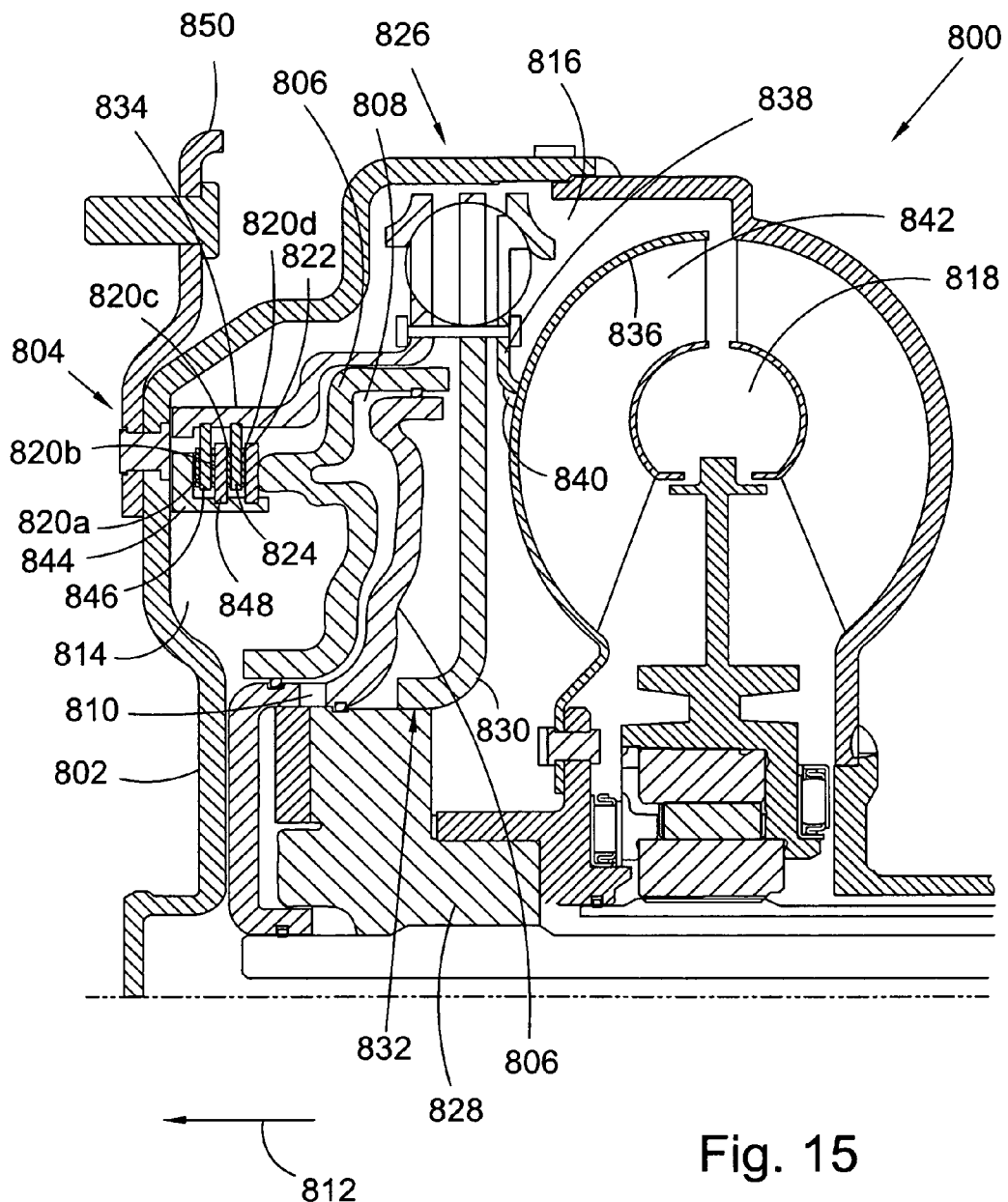

FIG. 15 is a partial cross-sectional view of present invention torque converter 800. Torque converter 800 includes cover 802, torque converter clutch 804, rotationally connected to the cover, and piston plate 806 for the clutch. The piston plate forms a portion of apply pressure chamber 808 for the clutch. That is, the piston plate forms a portion of the boundary of chamber 808. The pressure chamber is sealed with the exception of fluid supply channel 810, used to charge and vent the chamber. The piston plate is arranged to displace toward cover 802, that is, in direction 812, during lock-up mode for the torque converter, that is, when clutch 804 is closed.

Torque converter 800 also includes pressure chambers 814 and 816 and torus 818. Chamber 816 is in fluid communication with chamber 814 and the torus. The clutch includes friction material 820*a*, 820*b*, 820*c*, and 820*d*. Any type of friction material known in the art can be used. The friction material can be configured in any manner known in the art. For example, the friction material can be fastened to another component, such as drive plate 822, or can be separate elements that are disposed between other components, such as between drive plate 822 and friction plate 824. When the clutch is open, cooling fluid (not shown) flows from chamber 814, between the friction material to chamber 816 and the torus, providing a cooling flow for the torus. When the clutch is closed, the cooling fluid is arranged to flow from pressure chamber 814 through the friction material, for example, through grooves in the friction material, to the pressure chamber 816 and the torus. In some aspects, the cooling flow is reversed, that is, the cooling fluid flows from the torus to chamber 816 to chamber 814. Thus, torque converter 800 provides an advantageous cooling flow through the friction material, enhancing the performance and durability of the friction material, while continuing to supply cooling flow to the torus.

The operation of chamber 808 is independent of the operation of chambers 814 and 816. Specifically, the charging and venting of chamber 808, and hence the operation of clutch 804 is performed independent of the pressure and cooling fluid flow through chambers 814 and 816 and the torus. For example, chamber 808 is charged without interrupting the pressure is chambers 814 and 816, since chamber 812 is independently supplied with cooling fluid through channel 810. Therefore, chamber 814 continues to provide cooling fluid through the clutch friction material to chamber 816 and the torus during lock-up mode.

Torque converter 800 includes damper assembly 826, rotationally connected to turbine hub 828 through flange 830 and spline connection 832. The damper assembly is rotationally connected to the clutch through cover plate 834 and is rotationally connected to turbine shell 836 through cover plate 838. In some aspects, plate 838 is fixedly connected to the shell, for example, by weld 840. The connection of a torque converter clutch to a turbine hub is described in commonly-owned U.S. Provisional Patent Application No. 60/816,932, filed Jun. 28, 2006, which is incorporated by reference herein.

During torque converter mode, turbine 842 transmits torque directly to damper 826 through plate 838. Thus, the spline connection between a turbine hub and a damper as described in U.S. Provisional Patent Application No. 60/816,932, and the attendant potential vibration and rattle problems are eliminated. For example, the cover plate used in the above application to connect the damper to the turbine is obviated by the direct connection of plate 838 to the turbine shell. Thus, torque converter 800 eliminates the vibration and noise problem noted supra. In lock-up mode, engine torque is transmitted from the cover to carrier 844 to plates 822, 824, 846, and 848 to cover plate 834 and damper 826.

Carrier 844 is secured to the cover by any means known in the art. In some aspects, plates 822, 824, 846, and 848 are connected to cover plate 834 and carrier 844 by respective spline connections. The cover is connected to an engine or flexplate (not shown), by any means known in the art, for example, drive plate 850.

It should be understood that a present invention torque converter is not limited to the type, size, number, or configuration of components shown in the figures and that other types, sizes, numbers, or configurations of components are included in the spirit and scope of the claimed invention. For example, a present invention torque converter is not limited to the use of a torque converter clutch or damper with the configurations shown and other types of components and numbers, sizes, and configurations of components for a torque converter clutch or damper are included in the spirit and scope of the claimed invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter comprising:
   a cover;
   a torque converter clutch including an inner clutch carrier and a plurality of clutch plates with radially inward portions engaged with the inner clutch carrier;
   a first pressure chamber in fluid communication with a second pressure chamber through the torque converter clutch and in fluid communication with a torus; and,
   a flow-control element including an opening passing through a backing plate and disposed radially outward of the plurality of clutch plates, the flow-control element arranged to create an opening between the first and second chambers when the torque converter clutch is closed.

2. The torque converter of claim 1 including cooling fluid arranged to flow between the first and second chambers through spaces in the clutch and wherein the opening is separate from the spaces.

3. The torque converter of claim 1 wherein the opening is closed during lock-up mode for the torque converter.

4. The torque converter of claim 1 including a piston plate and wherein the clutch includes a drive plate, the piston plate is arranged to operate the clutch, and the flow-control element includes a compressible resilient element disposed between the piston plate and a friction plate.

5. The torque converter of claim 4 wherein when the clutch is open, the resilient element is arranged to urge the piston plate and the friction plate apart to create the opening between the piston plate and the friction plate and wherein when the clutch is closed, the piston plate is arranged to compress the resilient element against the friction plate to close the opening.

6. The torque converter of claim 1 wherein the flow-control element includes an orifice, with a pressure-controllable flap, for the chamber.

7. The torque converter of claim 6 wherein the flap is preloaded to remain closed and wherein the flap is arranged to displace to enable a flow of the cooling fluid from the first chamber through the orifice when pressure in the first chamber is greater than a combination of the preload on the flap and pressure in the second chamber.

8. The torque converter of claim 6 wherein the torque converter includes a friction plate at least partially disposed between the first and second chambers and wherein the orifice is disposed in the friction plate.

9. The torque converter of claim 6 wherein the clutch includes friction material and wherein when the clutch is closed, the cooling fluid is supplied to the second chamber, closing the flap and forcing a flow of cooling fluid through the friction material to the first chamber.

10. The torque converter of claim 7 wherein the flap includes a spring with an edge fixedly secured to the friction plate.

11. The torque converter of claim 1 further comprising a friction plate and a turbine hub rotationally connected to a damper and wherein the friction plate is rotationally connected to the turbine hub.

12. The torque converter of claim 1 including an apply chamber for the clutch and wherein pressure in the apply chamber is controlled independent of pressure in the first and second pressure chambers.

13. A torque converter comprising:
a torque converter clutch with a piston plate, a friction plate having a first surface forming a portion of a boundary for a first pressure chamber and a second surface forming a portion of a boundary for a second pressure chamber, and friction material disposed between the piston plate and the friction plate; and,
a flow-control element, separate from the friction material, arranged to regulate a pressure for cooling fluid in the first chamber to regulate a differential between respective pressures on the first and second surfaces by enabling flow between the first and second pressure chambers through grooves in the friction material when the torque converter clutch is closed.

14. The torque converter of claim 13 wherein when the clutch is closed, the flow-control element blocks flow of the cooling fluid out of the first chamber through the flow-control element.

15. The torque converter of claim 13 wherein the flow-control element enables a flow of the cooling fluid out of the chamber through the flow-control element to create a predetermined differential.

16. The torque converter of claim 13 wherein the flow-control element is arranged to regulate a pressure for cooling fluid in the first chamber to balance the respective pressures on the first and second surfaces.

17. The torque converter of claim 13 wherein the clutch includes a drive plate, the piston plate is arranged to operate the clutch, and the flow-control element includes a compressible resilient element disposed between the piston plate and the friction plate.

18. The torque converter of claim 17 wherein when the clutch is open, the resilient element is arranged to urge the piston plate and the friction plate apart to create a gap in the release chamber between the piston plate and the friction plate and wherein when the clutch is closed, the piston plate is arranged to compress the resilient element against the friction plate to close the gap between the piston plate and the friction plate.

19. The torque converter of claim 13 wherein the flow-control element includes an orifice, with a pressure-controllable flap, for the chamber.

20. The torque converter of claim 19 wherein the flap is preloaded to remain closed and wherein the flap is arranged to displace to enable a flow of the cooling fluid from the first chamber through the orifice when pressure in the first chamber is greater than a combination of the preload on the flap and pressure in the second chamber.

21. The torque converter of claim 19 wherein the orifice is disposed in the friction plate.

22. The torque converter of claim 19 wherein the clutch includes friction material and wherein when the clutch is closed, the cooling fluid is supplied to the second chamber, closing the flap and forcing a flow of cooling fluid through the friction material to the first chamber.

23. The torque converter of claim 19 wherein the flap includes a spring with an edge fixedly secured to the friction plate.

24. The torque converter of claim 13 further comprising a turbine hub rotationally connected to a damper and wherein the friction plate is rotationally connected to the turbine hub.

25. The torque converter of claim 13 including a torus and an apply chamber for the clutch, wherein the first pressure chamber is in fluid communication with the second pressure chamber and the torus and wherein pressure in the apply chamber is controlled independent of pressure in the first and second pressure chambers.

* * * * *